US010597169B2

(12) United States Patent
Gao et al.

(10) Patent No.: US 10,597,169 B2
(45) Date of Patent: Mar. 24, 2020

(54) METHOD OF AERIAL VEHICLE-BASED IMAGE PROJECTION, DEVICE AND AERIAL VEHICLE

(71) Applicant: SZ DJI TECHNOLOGY CO., LTD., Shenzhen (CN)

(72) Inventors: Mingming Gao, Shenzhen (CN); Kang Yang, Shenzhen (CN); Guyue Zhou, Shenzhen (CN); Hui Sun, Shenzhen (CN); Qiguang Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 188 days.

(21) Appl. No.: 15/409,280

(22) Filed: Jan. 18, 2017

(65) Prior Publication Data

US 2017/0166325 A1 Jun. 15, 2017

Related U.S. Application Data

(63) Continuation of application No. PCT/CN2014/082566, filed on Jul. 18, 2014.

(51) Int. Cl.
*B64C 39/02* (2006.01)
*H04N 7/18* (2006.01)
(Continued)

(52) U.S. Cl.
CPC ............ *B64D 47/00* (2013.01); *B64C 39/024* (2013.01); *G03B 21/14* (2013.01); *G03B 21/54* (2013.01);
(Continued)

(58) Field of Classification Search
CPC combination set(s) only.
See application file for complete search history.

(56) References Cited

U.S. PATENT DOCUMENTS

2009/0079942 A1* 3/2009 Lee .................. G03B 21/00
353/28
2012/0120069 A1* 5/2012 Kodaira ............... G06T 15/205
345/419
(Continued)

FOREIGN PATENT DOCUMENTS

CN 1668976 A 9/2005
CN 1707584 A 12/2005
(Continued)

OTHER PUBLICATIONS

The World Intellectual Property Organization (WIPO) International Search Report and Written Opinion for PCT/CN2014/082566 dated Apr. 24, 2015 8 Pages.
(Continued)

*Primary Examiner* — Dramos Kalapodas
*Assistant Examiner* — Samuel D Fereja
(74) *Attorney, Agent, or Firm* — Anova Law Group, PLLC

(57) ABSTRACT

A method and device for aerial vehicle-based image projection, and an aerial vehicle are provided. The method comprises adjusting a position of the aerial vehicle to a projection-permitted position if an image projection event for the aerial vehicle is detected, triggering a projection module of the aerial vehicle to project an image. Adjusting the position of the aerial vehicle comprises adjusting the position of the aerial vehicle based on an obstacle image captured in a projecting direction of the projection module.

11 Claims, 5 Drawing Sheets

(51) Int. Cl.
*G06K 9/00* (2006.01)
*B64D 47/00* (2006.01)
*G03B 21/14* (2006.01)
*G03B 21/54* (2006.01)
*H04N 9/31* (2006.01)
*G06F 3/16* (2006.01)

(52) U.S. Cl.
CPC ............ *G06F 3/16* (2013.01); *G06K 9/0063* (2013.01); *H04N 7/185* (2013.01); *H04N 9/3141* (2013.01); *H04N 9/3185* (2013.01); *H04N 9/3194* (2013.01); *B64C 2201/12* (2013.01)

(56) References Cited

U.S. PATENT DOCUMENTS

| | | | |
|---|---|---|---|
| 2014/0126756 A1* | 5/2014 | Gauger, Jr. | A61F 11/14 381/309 |
| 2014/0233099 A1* | 8/2014 | Stark | G09F 21/06 359/446 |

FOREIGN PATENT DOCUMENTS

| | | |
|---|---|---|
| CN | 102905976 A | 1/2013 |
| CN | 102929084 A | 2/2013 |
| EP | 2693366 A2 | 2/2014 |
| JP | 2001215990 A | 8/2001 |
| JP | 2005109916 A | 4/2005 |
| JP | 2005338114 A | 12/2005 |
| JP | 2008094277 A | 4/2008 |
| JP | 2014030897 A | 2/2014 |
| KR | 101128266 B1 | 3/2012 |
| WO | 0157853 A1 | 8/2001 |
| WO | 2011105502 A1 | 9/2011 |
| WO | 2014068982 A1 | 5/2014 |

OTHER PUBLICATIONS

Nazaki, Hiroki, Flying Display: A Movable Display Pairing Projector and Screen in the Air, CHI 2014, One of a CHInd, ACM, Apr. 26-May 1, 2014, pp. 909-914, Toronto, Canada.

Hiroki Nozaki, Flying Display: A Movable Display Pairing Projector and Screen in the Air, Proceeding CHI EA "14 CHI "14 Extended Abstracts on Human Factors in Computing Systems, May 2014. (Machine Translation included).

* cited by examiner

METHOD OF AERIAL VEHICLE-BASED IMAGE PROJECTION, DEVICE AND AERIAL VEHICLE

CROSS-REFERENCE TO RELATED APPLICATION

This is a continuation application of International Application No. PCT/CN2014/082566, filed on Jul. 18, 2014, the entire contents of which are incorporated herein by reference.

TECHNICAL FIELD

The present disclosure relates to the field of electronic technology, and in particular, to a method and device of aerial vehicle-based image projection, and an aerial vehicle.

BACKGROUND

A projector is a device capable of projecting an image (e.g., a file, a picture or a video) onto a screen for display. The projector can be connected with a mobile smart device, a computer and so on via various wired transmission interfaces to project an image (e.g., a file, a picture or a video). Existing projectors are generally fixedly mounted at a certain altitude. The projector can be matched with the screen by adjusting a position of the projector and a lens of the projector, such that images can be properly projected onto the screen.

However, the position of the existing projectors is fixed and not flexible enough. A disassembly and assembly of the projector is troublesome if images are to be projected at a new position.

SUMMARY

The present disclosure provides a method and device of aerial vehicle-based image projection, and an aerial vehicle. Information can be flexibly projected at projection-permitted positions by adjusting the aerial vehicle.

Embodiments of the present disclosure provide a method of image projection using an aerial vehicle. The method can comprise adjusting a position of the aerial vehicle to a projection-permitted position if an image projection event for the aerial vehicle is detected; and triggering a projection module of the aerial vehicle to project an image. In some instances, adjusting the position of the aerial vehicle can comprise adjusting the position of the aerial vehicle based on an obstacle image captured in a projecting direction of the projection module.

In some embodiments, after adjusting the position of the aerial vehicle to the projection-permitted position, the method can further comprise recording position information of the projection-permitted position, the position information comprising coordinate information and altitude information; and obtaining coordinate data and altitude data of the aerial vehicle during the image projection, comparing the obtained coordinate data and altitude data with the coordinate information and the altitude information of the projection-permitted position, and adjusting the position of the aerial vehicle based on a comparison result to hold the aerial vehicle at the projection-permitted position.

In some embodiments, adjusting the position of the aerial vehicle to the projection-permitted position if an image projection event for the aerial vehicle is detected can comprise adjusting the position of the aerial vehicle if the image projection event for the aerial vehicle is detected, detecting, at the adjusted position, whether there exists an obstacle satisfying a preset projection background condition; and if no obstacle satisfying the preset projection background condition exists, moving the aerial vehicle to a new position, and repeating this process until an obstacle satisfying the preset projection background condition is detected, and determining a position of the aerial vehicle as the projection-permitted position if there exists an obstacle satisfying the projection background condition. In some embodiments, the detected obstacle can be an obstacle in the projecting direction of the projection module of the aerial vehicle.

In some embodiments, detecting whether there exists an obstacle satisfying the preset projection background condition can comprise: obtaining, at the adjusted position, edges of an obstacle, a distance from a point of the obstacle to the aerial vehicle and an image enclosing the obstacle, determining whether the edges of the obstacle, the distance of the point of the obstacle, and a color and a texture of the obstacle in the image satisfy the preset projection background condition, and if the preset projection background condition is satisfied, determining that there exists an obstacle satisfying the preset projection background condition.

In some embodiments, the method can further comprise using a sound collecting module of the aerial vehicle to collect an original sound signal if a recording operation is detected, filtering the collected original sound signal based on a preset sound frequency of a propeller, to obtain a sound signal, and storing the obtained sound signal or sending the obtained sound signal to a user terminal.

Embodiments of the present disclosure provide a device for image projection using an aerial vehicle. The device can comprise a position adjusting module configured to adjust a position of the aerial vehicle to a projection-permitted position when an image projection event for the aerial vehicle is detected, and a projection controlling module configured to trigger a projection module of the aerial vehicle to project an image. In some embodiments, the position adjusting module can adjust the position of the aerial vehicle based on an obstacle image captured in a projecting direction of the projection module when the image projection event for the aerial vehicle is detected.

In some embodiments, the device can further comprise a storage module configured to record position information of the projection-permitted position. The position information comprises coordinate information and altitude information. In some instances, the position adjusting module can obtain coordinate data and altitude data of the aerial vehicle during the image projection, compare the obtained coordinate data and altitude data with the coordinate information and the altitude information of the projection-permitted position, and adjust the position of the aerial vehicle based on a comparison result to hold the aerial vehicle at the projection-permitted position.

In some embodiments, the position adjusting module can comprise an adjusting unit configured to adjust the position of the aerial vehicle if the image projection event for the aerial vehicle is detected, a detecting unit configured to detect, at the adjusted position, whether there exists an obstacle satisfying a preset projection background condition; and if no obstacle satisfying the preset projection background condition exists, notify the adjusting unit to move the aerial vehicle to a new position, and a determining unit configured to determine a position of the aerial vehicle as the projection-permitted position if there exists an obstacle satisfying the projection background condition. In some instances, the obstacle detected by the detecting unit can be an obstacle in the projecting direction of the projection module of the aerial vehicle.

In some embodiments, the detecting unit can obtain, at the adjusted position, edges of an obstacle, a distance from a point of the obstacle to the aerial vehicle and an image containing the obstacle, determine whether the edges of the obstacle, the distance of the point of the obstacle, and a color and a texture of the obstacle in the image satisfy the preset projection background condition, and if the preset projection background condition is satisfied, determine that there exists an obstacle satisfying the preset projection background condition.

In some embodiments, the device can further comprise a record processing module configured to use a sound collecting module of the aerial vehicle to collect an original sound signal if a recording operation is detected, and filter the collected original sound signal based on a preset sound frequency of a propeller, to obtain a sound signal, and an outputting module configured to store the obtained sound signal or send the obtained sound signal to a user terminal.

Embodiment of the present disclosure can further provide an aerial vehicle. The aerial vehicle can comprise a controller and a carrier configured to carry an external projection device. In some embodiments, the controller can be configured to adjust a position of the aerial vehicle to a projection-permitted position if an image projection event for the aerial vehicle is detected, and trigger the projection device carried by the carrier to project an image. In some embodiments, adjusting the position of the aerial vehicle can comprise adjusting the position of the aerial vehicle based on an obstacle image captured in a projecting direction of the projection device.

In some embodiments, the controller can record position information of the projection-permitted position, position information comprising coordinate information and altitude information, obtain coordinate data and altitude data of the aerial vehicle during the image projection, compare the obtained coordinate data and altitude data of the aerial vehicle with the coordinate information and altitude information of the projection-permitted position, and adjust the position of the aerial vehicle based on a comparison result, such that the aerial vehicle is held at the projection-permitted position.

In some embodiments, the aerial vehicle can further comprise a detector configured to detect edges of an obstacle and a distance from a point of the obstacle to the aerial vehicle. The obstacle can be an obstacle in the projecting direction of the projection device carried by the carrier. The aerial vehicle can further comprise a camera configured to capture an image containing the obstacle. In some embodiments, the controller can determine whether (1) the edges of the obstacle and the distance of the point of the obstacle, which are provided by the detector, and (2) the color and texture of the obstacle in the image captured by the camera satisfy the preset projection background condition, and if the preset projection background condition is satisfied, determine that there exists an obstacle satisfying the preset projection background condition.

In some embodiments, the aerial vehicle can further comprise a sound pickup unit configured to use a sound collecting module of the aerial vehicle to collect an original sound signal if a recording operation is detected. In some embodiments, the controller filters the collected original sound signal based on a preset sound frequency of a propeller, to obtain a sound signal; and stores the obtained sound signal or sends the obtained sound signal to a user terminal.

With the present disclosure, an aerial vehicle can be used in combination with a projection module such as a projector. A position for projection can be rapidly altered as needed by controlling a flight of the aerial vehicle, thus realizing a rapid and flexible image projection.

DETAILED DESCRIPTION OF THE EMBODIMENTS

Technical solutions of the present disclosure will be described with reference to the drawings. It will be appreciated that embodiments as described in the disclosure are some rather than all of the embodiments of the present disclosure. Other embodiments, which are conceived by those having ordinary skills in the art on the basis of the disclosed embodiments without inventive efforts, should fall within the scope of the present disclosure.

According to the present disclosure, a projector can be triggered to project image data at projection-permitted positions where a white wall, a screen, etc. are available, by combining an aerial vehicle such as a UAV (Unmanned Aerial Vehicle) with a projection device such as the projector.

Figure 1:
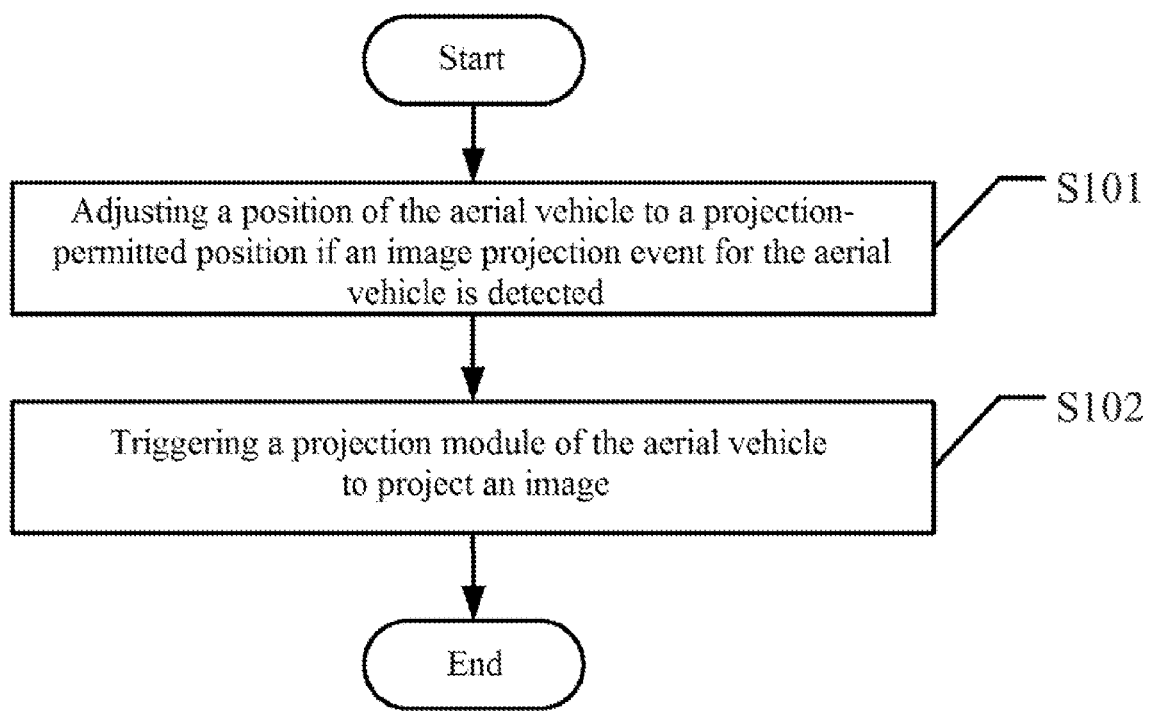
FIG. 1 is a flow chart of a method of aerial vehicle-based image projection according to an embodiment of the present disclosure.

FIG. 1 is a flow chart of a method of aerial vehicle-based image projection according to an embodiment of the present disclosure. The method can be implemented by a controller onboard the aerial vehicle. In some embodiments, the method can comprise processes S101 to S102.

In process S101, a position of the aerial vehicle can be adjusted to a projection-permitted position if an image projection event for the aerial vehicle is detected.

In some instances, adjusting the position of the aerial vehicle can comprise adjusting the position of the aerial vehicle based on an image of an obstacle which is obtained in a projecting direction of a projection module of the aerial vehicle.

The projection-permitted position can comprise positions where a certain altitude is reached and a plane or a substantial plane is available in the projecting direction of the projection module of the aerial vehicle (e.g., in front of a projection lens). The plane or the substantial plane can be suitable for image projection. The plane or the substantial plane can be a white wall or a screen.

Position adjustment of the aerial vehicle can be triggered by a user instruction which is sent to a controller of the aerial vehicle through a remote controller. The controller can control a propulsion system of the aerial vehicle, which comprises a motor, an electronic speed controller, a propeller, etc., to perform flight operations. The aerial vehicle can be moved to a projection-permitted position by controlling a flight of the aerial vehicle. A region having a sufficient area for image projection can exist in front of the projection-permitted position. The region can be an obstacle plane (e.g., a white wall), a distance between each point of the region and a distance detecting module satisfying the requirements of a flat plane.

Alternatively, a position of the aerial vehicle can be adjusted and determined based on (1) a pixel value of an image of an obstacle, which is captured in the projection direction, and (2) a distance from each point of the obstacle to the aerial vehicle as detected. In other words, the position of the aerial vehicle can be adjusted automatically based on data acquired by an imaging device and a distance detecting device onboard the aerial vehicle, and can be processed by the controller of the aerial vehicle. In some instances, obstacle information such as a color, texture and so on can be determined based on the pixel value, and information on a distance of the obstacle relative to the projection lens and an inclination angle of the obstacle relative to the projection lens or the ground and so on can be determined from the distance detecting device. Obstacles suitable for image projection can be determined based on the obtained information such as the color, the texture, the distance, the inclination angle, etc. The position, at which the obstacle is determined as suitable for image projection, can be determined as the projection-permitted position.

The image projection event can be detected when a user controls the projector and starts an image projection with a projection remote controller. Optionally, the image projection event can be detected when a user sends a projection instruction to the aerial vehicle through a remote controller of the aerial vehicle.

A projection module such as a projector can be carried onboard the aerial vehicle. For instance, the projector can be and fixed to and controlled by a gimbal of the aerial vehicle. Optionally, the projector can also be fixedly arranged on the aerial vehicle, and receive signals from the controller of the aerial vehicle.

In process S102, a projection module of the aerial vehicle can be triggered to project an image.

Sufficient electrical power can be provided to the projection module such as a projector if the aerial vehicle flies to a position suitable for image projection (e.g., the projection-permitted position), such that the projector can project data (such as a video, a picture, a file, etc.) transmitted wirelessly from ground devices (such as a computer, a smartphone, etc.).

Alternatively, the projected data can be data stored in a storage device. The storage device can be internally provided in or externally carried on the aerial vehicle or projector. In projecting, the projection module can read the data stored in the storage module and project it onto a wall surface or a screen in the projection direction. The projection of the projection module can be controlled by a remote controller that is matched with the projection module in advance. For instance, a progress and a luminance of the projection can be controlled.

The image projection method of the present disclosure can be implemented in an indoor environment or an outdoor environment. If the aerial vehicle is in an outdoor environment with satisfactory GPS signal, a hovering position of the aerial vehicle can be automatically held based on GPS data. If the aerial vehicle is in an indoor environment, a hovering position of the aerial vehicle can be automatically held based on sensor modules such as a gyroscope, an accelerometer, an altimeter and a visual sensor, etc.

In embodiments of the present disclosure, an aerial vehicle can be used in combination with a projection module such as a projector. A position for projection can be rapidly altered as needed by controlling a flight of the aerial vehicle, thus realizing a rapid and flexible image projection.

Figure 2:
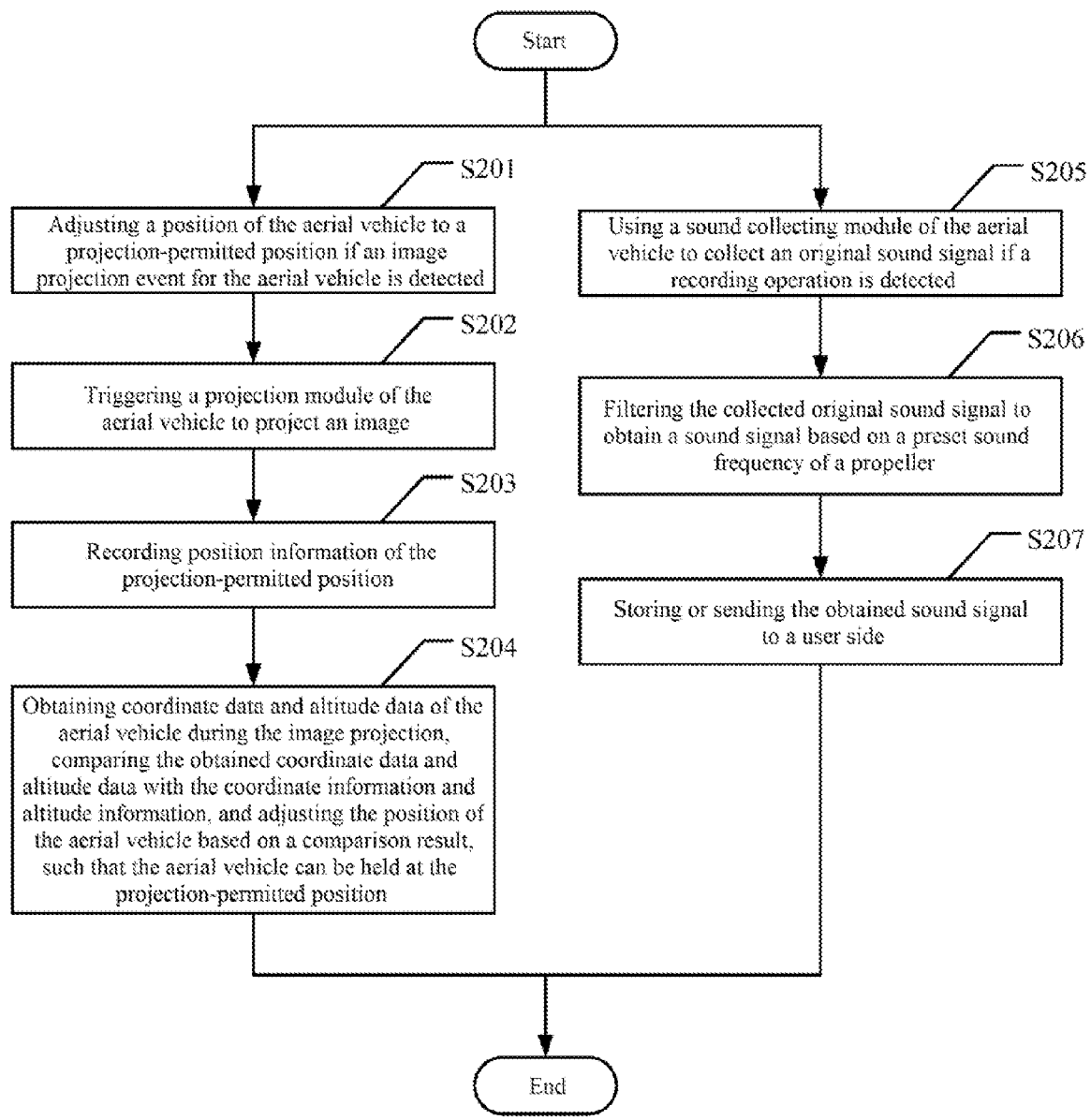
FIG. 2 is a flow chart of another method of aerial vehicle-based image projection according to an embodiment of the present disclosure.

FIG. 2 is a flow chart of another method of aerial vehicle-based image projection according to an embodiment of the present disclosure. The method can be implemented by a controller onboard the aerial vehicle. In some embodiments, the method can comprise processes S201 to S207.

In process S201, a position of the aerial vehicle can be adjusted to a projection-permitted position if an image projection event for the aerial vehicle is detected.

In some instances, adjusting the position of the aerial vehicle can comprise adjusting the position of the aerial vehicle based on an image of an obstacle which is acquired in a projecting direction of the projection module.

In process S202, a projection module of the aerial vehicle can be triggered to project an image.

The projection module can comprise devices such as a projector. The projection module can be carried onboard the aerial vehicle and fixed to the aerial vehicle through devices such as a gimbal. The projection module can be internally disposed in the aerial vehicle, and receive signals from the controller of the aerial vehicle.

The projection module can wirelessly receive projected data, such as a file, a picture and a video, from ground side devices such as a computer, a smartphone. Alternatively, the projected data can be data stored in a storage device. The storage device can be internally provided in or externally carried on the aerial vehicle or projector. In projecting, the projection module can read the data stored in the storage module and project it onto the wall surface or the screen in the projection direction.

In process S203, position information of the projection-permitted position is recorded. The position information can comprise coordinate information and altitude information.

In process S204, coordinate data and altitude data of the aerial vehicle can be obtained during the image projection. The obtained coordinate data and altitude data of the aerial vehicle can be compared with the coordinate information and altitude information of the projection-permitted position, and the position of the aerial vehicle can be adjusted based on a comparison result, such that the aerial vehicle can be held at the projection-permitted position.

In some instances, the coordinate information of the aerial vehicle can be obtained from the GPS, and the altitude information of the aerial vehicle can be obtained from a barometer or a distance detecting device such as ultrasonic waves, a camera, etc. With the S203 and S204, a vibration occurred to the projection can be avoided or otherwise reduced to a small range.

In process S205, a sound collecting module of the aerial vehicle can be used to collect an original sound signal if a recording operation is detected.

In process S206, the collected original sound signal can be filtered to obtain a sound signal based on a preset sound frequency of a propeller.

In process S207, the obtained sound signal can be stored or sent to a user terminal.

Upon obtaining the original sound signal, the original analog sound signal can be converted into a digital signal through an analog/digital conversion. The digital sound signal can be converted into an analog signal for displaying when the sound signal is to be displayed at the user terminal.

Figure 3:
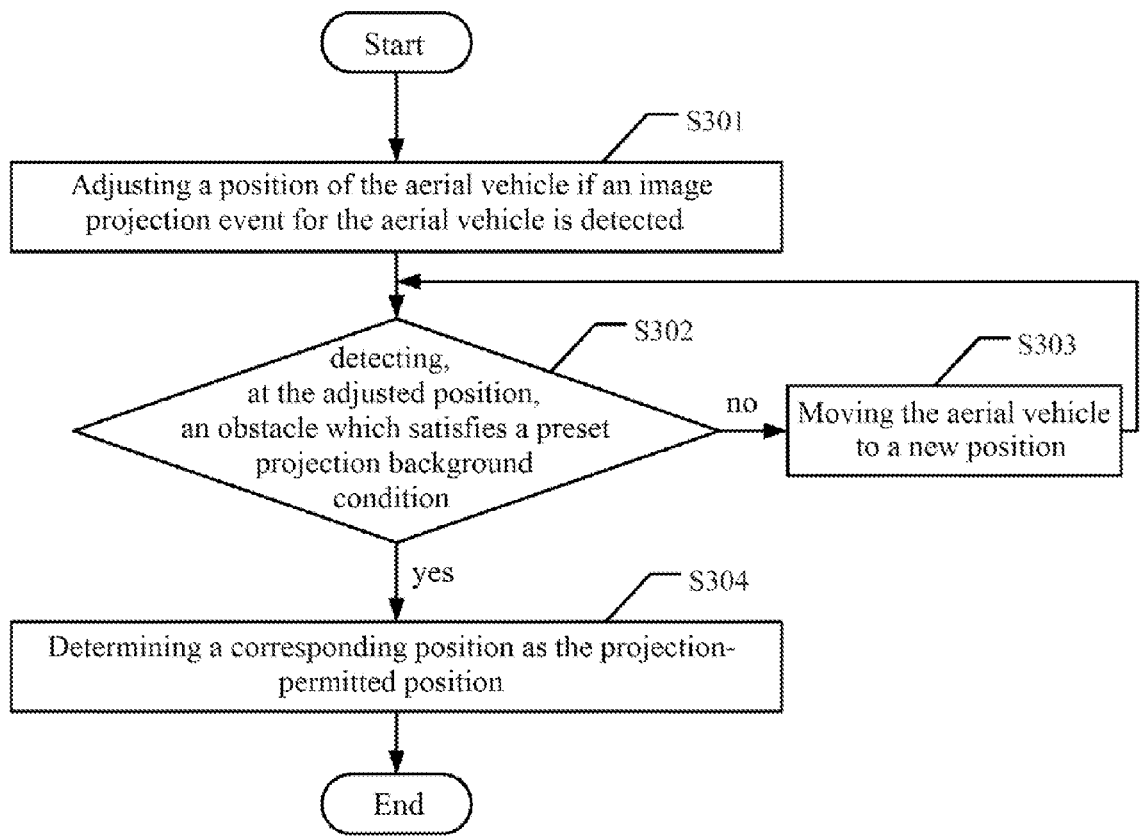
FIG. 3 is a flow chart of a method of adjusting an aerial vehicle to a projection-permitted position according to an embodiment of the present disclosure.

FIG. 3 is a flow chart of a method of adjusting an aerial vehicle to a projection-permitted position according to an embodiment of the present disclosure. The method can automatically adjust a position of the aerial vehicle to a position which is suitable for image projection. The method can substantially correspond to above-described process S101 or process S201. In some embodiments, the method can comprise processes S301 to S304.

In process S301, a position of the aerial vehicle can be adjusted if an image projection event for the aerial vehicle is detected.

A position adjusting operation can be performed to the aerial vehicle if a remote controlling signal for a projection module (e.g., a projector) indicative of starting a projection is detected. The position adjusting operation can include operations such as powering on, taking off and position detecting, etc.

In process S302, an obstacle, which satisfies a preset projection background condition, can be detected at the adjusted position. The obstacle can be an obstacle in a projecting direction of the projection module of the aerial vehicle. In some instances, the obstacle can be detected by means of visual identification and distance detection to determine whether the obstacle in the projecting direction of the projection module (e.g., a projector) satisfies the preset condition.

In some instances, the preset projection background condition can comprise (1) the color being white (or a pixel value being within a preset range of pixel values), (2) the image texture being not obvious (or a variation of a distance from respective point in the region to the distance detecting device being within a preset range), and/or (3) an average distance to the distance detecting device and an area thereof being within a preset range. Those regions satisfying the preset projection background condition can be used as a projection background. In a preferred embodiment, the projection background can be a white wall of a building or a screen.

In some embodiments, in the process S302, images can be collected from an imaging device. A region having white color and no texture or non-obvious texture can be identified from the images. Edges of the region can be detected with a bi-camera device, a laser distance detecting device or an ultrasonic distance detecting device, and an area of the region can be measured from the edges. If the distance and area can satisfy a normal projection condition of the projector, then the obstacle, which corresponds to the region having white color, no texture, and a distance and an area satisfying the normal projection condition, can meet the preset projection background condition.

In some embodiments, the process S302 can comprise (1) obtaining, at the adjusted position, edges of an obstacle, a distance from each point of the obstacle to the aerial vehicle and an image enclosing the obstacle; (2) determining whether the edges of the obstacle, the distance of each point of the obstacle to the aerial vehicle, the color and the texture of the obstacle in the image satisfy the preset projection background condition; and (3) if the preset projection background condition is satisfied, determining there exists an obstacle satisfying the preset projection background condition. In other words, the color and texture of a region in an image, which corresponds to the obstacle, can be obtained from the pixel value. The area of the corresponding region can be obtained from the edges. An evenness (e.g., a certain inclination or unevenness may not satisfy the preset condition) of the corresponding region can be obtained from the distance of each point of the region to the aerial vehicle. The surface of the obstacle, which faces the aerial vehicle, can be determined as qualifying a projection background wall or a projection screen by considering the above factors.

In process S303, if there's no obstacle satisfying the preset projection background condition, the aerial vehicle can be moved to a new position. The process S302 can be performed until an obstacle is determined as satisfying the preset projection background condition.

If no obstacle is identified at the current position as satisfying the preset projection background condition, an instruction can be provided to a propulsion system of the aerial vehicle to move the aerial vehicle to a new position, at which a determination is made on whether the newly detected obstacle satisfies the preset projection background condition.

A processing time of the process S302 can be short, therefore, an obstacle (such as a white wall) satisfying the preset projection background condition can be rapidly identified.

In process S304, if there is an obstacle satisfying the projection background condition, a position of the aerial vehicle can be determined as the projection-permitted position.

If the projection-permitted position is determined, then the process of determining whether a region satisfies the preset condition can be terminated and a subsequent process of image projection and position holding can be performed.

In embodiments of the present disclosure, an aerial vehicle can be used in combination with a projection module such as a projector. A position for projection can be rapidly altered as needed by controlling a flight of the aerial vehicle. A determination on whether a region is appropriate for image projection can be automatically performed by the controlling, a camera, and a distance detecting device. A rapid and flexible image projection can be realized, and a user requirement on automation and intelligence can be satisfied.

A device of aerial vehicle-based image projection and an aerial vehicle according to an embodiment of the present disclosure will be described.

Figure 4:
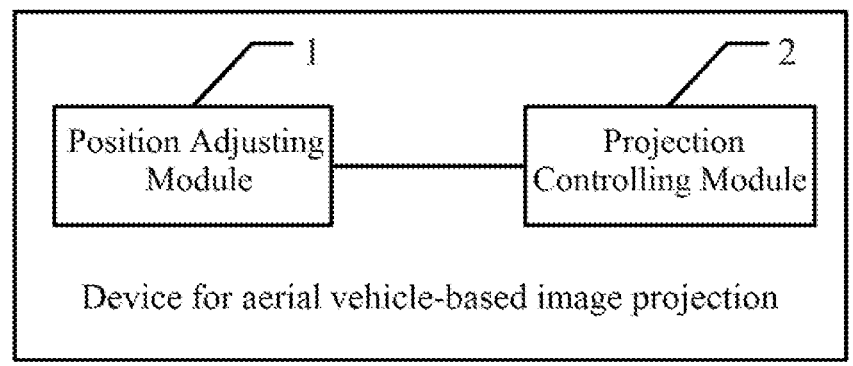
FIG. 4 is a view showing a structure of a device for aerial vehicle-based image projection according to an embodiment of the present disclosure.

FIG. 4 is a view showing a structure of a device for aerial vehicle-based image projection according to an embodiment of the present disclosure. The device according to the embodiment of the present disclosure can be provided in a controller of the aerial vehicle. In some instances, the device can comprise a position adjusting module 1 and a projection controlling module 2.

The position adjusting module 1 can adjust a position of the aerial vehicle to a projection-permitted position when an image projection event for the aerial vehicle is detected. In some instance, the position adjusting module 1 can adjust the position of the aerial vehicle based on an image of an obstacle obtained in a projecting direction of a projection module when an image projection event for the aerial vehicle is detected.

The projection controlling module 2 can trigger the projection module of the aerial vehicle to project an image.

In the position adjusting module 1 adjusting the position of the aerial vehicle, the projection-permitted position can comprise positions where a certain altitude is reached and a plane or a substantial plane is available in the projecting direction of the projection module of the aerial vehicle (e.g., in front of a projection lens). The plane or the substantial plane can be suitable for image projection. The plane or the substantial plane can be a white wall or a screen.

Position adjustment of the position adjusting module 1 can be triggered by a user instruction which is sent through a remote controller. The user instruction can control the propulsion system of the aerial vehicle to perform flight operations, so as to move the aerial vehicle to a projection-permitted position. A region having an area sufficient for image projection can exist in front of the projection-permitted position. The region can be an obstacle plane (e.g., a wall plane), a distance between each point of the region and a distance detecting module satisfying the requirements of a flat plane.

Alternatively, position adjustment of the position adjusting module 1 can be performed based on (1) a pixel value of an image of an obstacle, which is captured in the projection direction, and (2) a distance from each point of the obstacle to the aerial vehicle as detected. In other words, the position of the aerial vehicle can be adjusted automatically based on data acquired by an imaging device and a distance detecting device onboard the aerial vehicle. In some instances, the position adjusting module 1 can determine obstacle information such as a color, texture and so on based on the pixel value, and determine information on a distance of the obstacle relative to the projection lens and an inclination angle of the obstacle relative to the projection lens or the ground and so on with the distance detecting device. The position adjusting module 1 can determine if the obstacle is suitable for image projection based on the obtained information such as the color, the texture, the distance, the inclination angle, etc. The position, at which the obstacle is determined as suitable for image projection, can be determined as the projection-permitted position.

In some instances, the capturing direction of the lens of the imaging device can coincide with the projecting direction of the projection module. The distance detecting device can comprise an ultrasonic device and/or two imaging devices. The imaging device can capture images in the projecting direction of the projection module. The color, texture, etc., of a plane in front of the projection module can be determined based on pixel values of pixels in the image, such that the color of the image projection plane of the projection module can be a color suitable for image projection (such as a white color). The distance detecting device can measure, within a detection range, a distance from each point in the projecting direction of the projection module to the aerial vehicle or the distance detecting device, so as to determine a level of smooth of a front plane, an angle of the plane relative to the aerial vehicle, an angle of the plane relative to the ground, the edge and the area of the plane, etc. The position adjusting module 1 can automatically control the aerial vehicle to fly to a position which is suitable for projecting images based on the color, the texture of a plane and the level of smooth of the plane, the angle of the plane relative to the aerial vehicle, the angle of the plane relative to the ground, the edge and the area of the plane, etc. For instance, based on the image captured by the imaging device or the distance of each point detected by the distance detecting device, the current position can be determine as a projection-permitted position if a wall surface is determined to have a white color, a sufficient area for image projection, and distance value from each point to the distance detecting module satisfying a flat plane.

The image projection event of the position adjusting module 1 can be detected when a user controls the projector and starts an image projection with a projection remote controller. Optionally, the image projection event of the position adjusting module 1 can be detected when a user sends a projection instruction to the aerial vehicle through a remote controller of the aerial vehicle.

A projection module such as a projector can be carried onboard the aerial vehicle. For instance, the projector can be and fixed to and controlled by a gimbal of the aerial vehicle. Optionally, the projector can also be fixedly arranged on the aerial vehicle, and receive signals from the controller of the aerial vehicle.

The projection controlling module 2 can control to provide sufficient electrical power to the projection module (such as a projector) if the aerial vehicle flies to a position suitable for image projection (e.g., the projection-permitted position), such that the projector can project data (such as a video, a picture, a file, etc.) transmitted wirelessly from ground devices (such as a computer, a smartphone, etc.). Alternatively, the projected data can be data stored in a storage device. The storage device can be internally provided in or externally carried on the aerial vehicle or projector. In projecting, the projection module can read the data stored in the storage module and project it onto a wall surface or a screen in the projection direction.

The image projection method of the present disclosure can be implemented in an indoor environment or an outdoor environment. If the aerial vehicle is in an outdoor environment with satisfactory GPS signal, a hovering position of the aerial vehicle can be automatically held based on GPS data. If the aerial vehicle is in an indoor environment, a hovering position of the aerial vehicle can be automatically held based on sensor modules such as a gyroscope, an accelerometer, an altimeter and a visual sensor, etc.

In embodiments of the present disclosure, an aerial vehicle can be used in combination with a projection module such as a projector. A position for projection can be rapidly altered as needed by controlling a flight of the aerial vehicle, thus realizing a rapid and flexible image projection.

Figure 5:
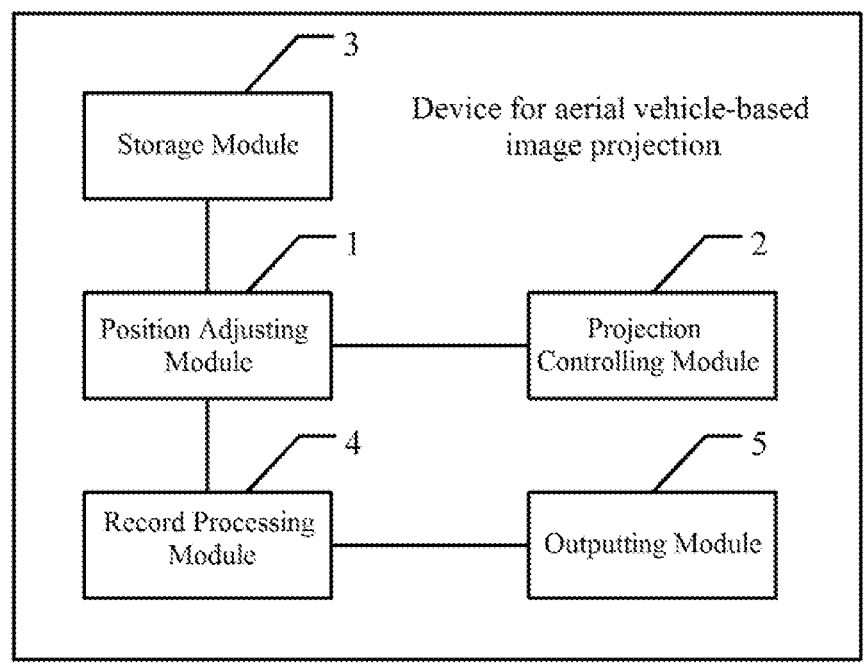
FIG. 5 is a view showing a structure of another device of aerial vehicle-based image projection according to an embodiment of the present disclosure.

FIG. 5 is view showing a structure of another device for aerial vehicle-based image projection according to an embodiment of the present disclosure. The device of according to the embodiment of the present disclosure can comprise the position adjusting module 1 and the projection controlling module 2 of the embodiment as discussed hereinabove with reference to FIG. 4. The device can further comprise a storage module 3.

The storage module 3 can record position information of the projection-permitted position. The position information can comprise coordinate information and altitude information.

The position adjusting module 1 can further obtained coordinate data and altitude data of the aerial vehicle during the image projection. The position adjusting module 1 can compare the obtained coordinate data and altitude data of the aerial vehicle with the coordinate information and altitude information of the projection-permitted position, and adjust the position of the aerial vehicle based on a comparison result, such that the aerial vehicle can be held at the projection-permitted position.

In some instances, the coordinate information of the aerial vehicle can be obtained from the GPS, and the altitude information of the aerial vehicle can be obtained from a barometer or a distance detecting device such as ultrasonic waves, a camera, etc. By means of the storage module 3 and the position adjusting module 1, a vibration occurred to the projection can be avoided or otherwise reduced to a small range.

Figure 6:
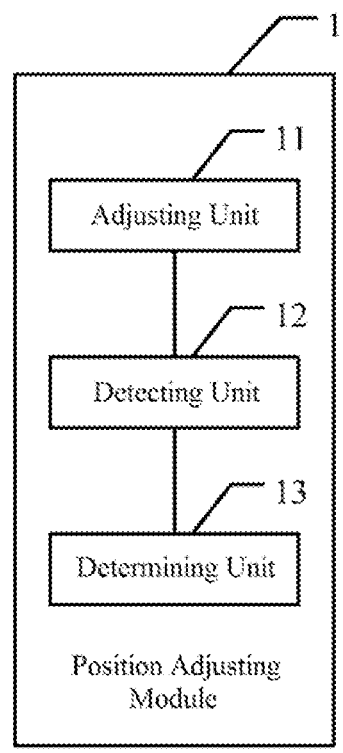
FIG. 6 is a view showing a structure of a position adjusting module of FIG. 5.

In some embodiments, as shown in FIG. 6, the position adjusting module 1 can comprise an adjusting unit 11, a detecting unit 12 and a determining unit 13.

The adjusting unit 11 can adjust a position of the aerial vehicle if an image projection event for the aerial vehicle is detected.

The detecting unit 12 can detect, at the adjusted position, whether there exists an obstacle which satisfies a preset projection background condition. If no such obstacle exists, the detecting unit 12 can notify the adjusting unit 11 to adjust the position of the aerial vehicle to a new position.

The determining unit 13 can determine a position as the projection-permitted position if there is an obstacle satisfying the projection background condition.

In some instances, the obstacle can be an obstacle in the projecting direction of the projection module of the aerial vehicle.

The adjusting unit 11 can perform a position adjusting operation to the aerial vehicle if a remote controlling signal for a projection module (e.g., a projector) indicative of starting a projection is detected. The position adjusting operation can include operations such as powering on, taking off and position detecting, etc.

The detecting unit 12 can detect an obstacle by means of visual identification and distance detection to determine whether the obstacle in the projecting direction of the projection module (e.g., a projector) satisfies the preset condition. Any details on detecting and determining operations of the detecting unit 12 can be found with reference to the embodiments as described hereinabove.

In some embodiments, the detecting unit 12 can (1) obtain, at the adjusted position, edges of an obstacle, a distance from each point of the obstacle to the aerial vehicle and an image enclosing the obstacle; (2) determine whether the edges of the obstacle, the distance of each point of the obstacle to the aerial vehicle, the color and the texture of the obstacle in the image satisfy the preset projection background condition; (3) if the preset projection background condition is satisfied, determine there exists an obstacle satisfying the preset projection background condition; and (4) if the preset projection background condition is not satisfied, notify the adjusting unit 11 to adjust the position of the aerial vehicle to a new position.

In some embodiments, the device for aerial vehicle-based image projection can further comprise a record processing module 4 and an outputting module 5.

The record processing module 4 can use a sound collecting module of the aerial vehicle to collect an original sound signal if a recording operation is detected, and filter the collected original sound signal to obtain a sound signal based on a preset sound frequency of a propeller.

The outputting module 5 can store or send the obtained sound signal to a user terminal.

Upon obtaining the original sound signal, the record processing module 4 can convert the original analog sound signal into a digital signal through an analog/digital conversion. The digital sound signal can be converted into an analog signal for displaying when the sound signal is to be displayed at the user terminal.

In embodiments of the present disclosure, an aerial vehicle can be used in combination with a projection module such as a projector. A position for projection can be rapidly altered as needed by controlling a flight of the aerial vehicle. A determination on whether a region is appropriate for image projection can be automatically performed by the controlling, a camera, and a distance detecting device. A rapid and flexible image projection can be realized, and a user requirement on automation and intelligence can be satisfied.

Figure 7:
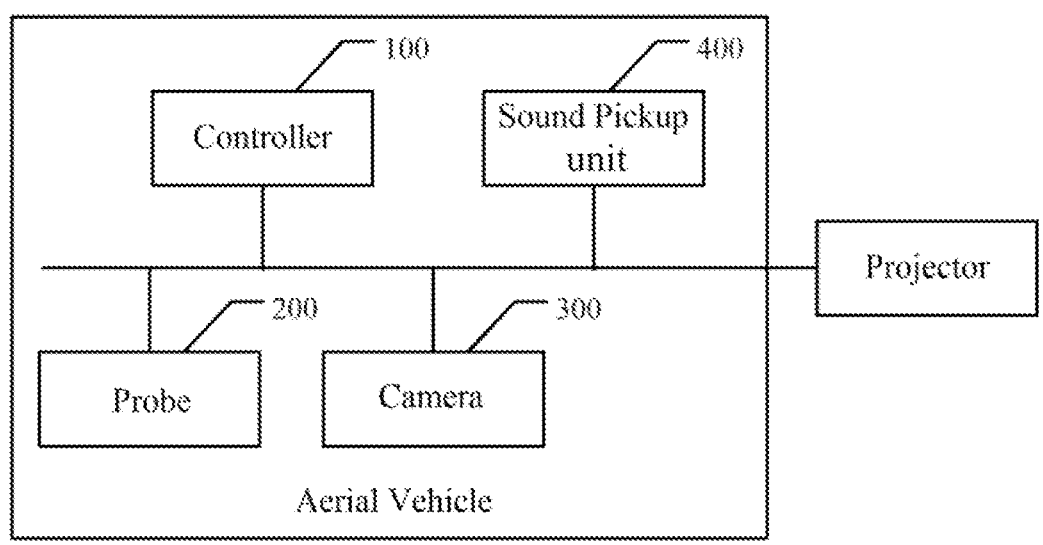
FIG. 7 is a view showing a structure of an aerial vehicle according to an embodiment of the present disclosure.

FIG. 7 is a view showing a structure of an aerial vehicle according to an embodiment of the present disclosure. The aerial vehicle can comprise a controller 100 and a carrier for carrying an external projection device.

The controller 100 can adjust a position of the aerial vehicle to a projection-permitted position if an image projection event for the aerial vehicle is detected, and trigger a projection module carried by the carrier to project an image. In some instances, adjusting the position of the aerial vehicle can comprise adjusting the position of the aerial vehicle based on an image of an obstacle which is obtained in a projecting direction of the projection module.

In some instances, the controller 100 can further record position information of the projection-permitted position. The position information can comprise coordinate information and altitude information. The controller 100 can further obtain coordinate data and altitude data of the aerial vehicle during the image projection, compare the obtained coordinate data and altitude data of the aerial vehicle with the coordinate information and altitude information of the projection-permitted position, and adjust the position of the aerial vehicle based on a comparison result, such that the aerial vehicle can be held at the projection-permitted position.

In some instances, the aerial vehicle can further comprise a detector 200 and a camera 300.

The detector 200 can detect edges of an obstacle and a distance from each point of the obstacle to the aerial vehicle. The obstacle can be an obstacle in the projecting direction of the projection device that is carried by the carrier.

The camera 300 can capture images which enclose the obstacle.

The controller 100 can further determine whether (1) the edges of the obstacle and the distance of each point of the obstacle, which are provided from the detector 200, and (2) the color and texture of the obstacle in the image captured by the camera 300 satisfy the preset projection background condition. If the preset projection background condition is satisfied, the controller 100 can determine that there exists an obstacle satisfying the preset projection background condition.

In some instances, the aerial vehicle can further comprise a sound pickup unit 400.

The sound pickup unit 400 can use a sound collecting module of the aerial vehicle to collect an original sound signal if a recording operation is detected. The controller 100 can filter the collected original sound signal to obtain a sound signal based on a preset sound frequency of a propeller, and store or send the obtained sound signal to a user terminal.

The controller 100, the detector 200, the camera 300 and the sound pickup unit 400 according to the embodiment of the present disclosure can be implemented with reference to the above described embodiments of FIG. 1 to FIG. 6.

In embodiments of the present disclosure, an aerial vehicle can be used in combination with a projection module such as a projector. A position for projection can be rapidly altered as needed by controlling a flight of the aerial vehicle. A determination on whether a region is appropriate for image projection can be automatically performed by the controller, a camera, and distance detecting device. A rapid and flexible image projection can be realized, and a user requirement on automation and intelligence can be satisfied.

It will be appreciated that, in the embodiments described hereinabove, the disclosed devices and methods can be implemented by various ways. For instance, the above-described device embodiments are merely schematic. For example, a division of the modules or units is merely a division in logic function, and other division manners of the modules or units can be otherwise implemented. In some instances, a plurality of units or components can be combined or integrated into another system. Optionally, some features can be omitted or not performed. Furthermore, a coupling, a direct coupling or a direct communication connection between modules can be an indirect coupling or an indirect communication connection via an interface. An indirect coupling or a communication connection between modules can be in electrical coupling, mechanical coupling or a coupling in other forms.

Units described as separate parts can or cannot be physically separated. Components shown as units can or cannot be physical units, for instance, they can be located in one place, or can be distributed into a plurality of network units. Some or all of the units can be selected to achieve the objects of the embodiments in view of actual requirements.

Various functional units described in various embodiments of the present disclosure can be integrated into one processing unit. Optionally, the various functional units can be physical individuals. Two or more of the various function units can be integrated into one unit. The integrated unit can be implemented in a form of hardware or in a form of software functional units.

If integrated units are implemented in a form of software functional units and sold or used as independent products, they can be stored in a computer readable storage medium. In this concept, the part or all of the technical solution, can be embodied in a form of a software product. The software product can be stored in a storage medium. The software product can comprise instructions which cause a computer processor to execute some or all of the processes of methods in various embodiments of the present disclosure. The above-mentioned storage medium can comprise various medium capable of storing program codes, such as a USB flash disk, a movable hard disc, a Read-Only Memory (ROM), a random access memory (RAM), a diskette or an optical disc.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A method of image projection using an aerial vehicle, comprising:
   adjusting a position of the aerial vehicle to a projection-permitted position if an image projection event for the aerial vehicle is detected, comprising:
      adjusting the position of the aerial vehicle if the image projection event for the aerial vehicle is detected;
      obtaining, at the adjusted position, edges of a candidate obstacle, a distance from a point of the candidate obstacle to the aerial vehicle, and an obstacle image of the candidate obstacle captured in a projecting direction of a projector carried by the aerial vehicle;
      determining whether the edges of the candidate obstacle, the distance from the point of the candidate obstacle, and a color and a texture of the candidate obstacle in the obstacle image satisfy a preset projection background condition; and
      if the preset projection background condition is satisfied, determining that the candidate obstacle is a target obstacle satisfying the preset projection background condition and that the adjusted position is the projection-permitted position; and
   triggering the projector carried by the aerial vehicle to project an image onto the target obstacle.

2. The method of claim 1, further comprising, after adjusting the position of the aerial vehicle to the projection-permitted position:
   recording position information of the projection-permitted position, the position information comprising coordinate information and altitude information; and
   obtaining coordinate data and altitude data of the aerial vehicle during the image projection, comparing the obtained coordinate data and altitude data with the coordinate information and the altitude information of the projection-permitted position, and adjusting the position of the aerial vehicle based on a comparison result to hold the aerial vehicle at the projection-permitted position.

3. The method of claim 1, wherein adjusting the position of the aerial vehicle to the projection-permitted position if the image projection event for the aerial vehicle is detected further comprises, if no obstacle satisfying the preset projection background condition exists:
   moving the aerial vehicle to a new position; and
   repeating the detecting and moving until an obstacle satisfying the preset projection background condition is detected.

4. The method of claim 1, further comprising:
   using a sound collector of the aerial vehicle to collect an original sound signal if a recording operation is detected;
   filtering the collected original sound signal based on a preset sound frequency of a propeller, to obtain a sound signal; and
   storing the obtained sound signal or sending the obtained sound signal to a user terminal.

5. A device for image projection using an aerial vehicle, comprising:
   a storage medium; and
   a processor coupled to the storage medium and configured to execute instructions stored in the storage medium to:
      adjust a position of the aerial vehicle to a projection-permitted position when an image projection event for the aerial vehicle is detected, comprising:
         adjusting the position of the aerial vehicle if the image projection event for the aerial vehicle is detected;
         obtaining, at the adjusted position, edges of a candidate obstacle, a distance from a point of the candidate obstacle to the aerial vehicle, and an obstacle image of the candidate obstacle captured in a projecting direction of a projector carried by the aerial vehicle;
         determining whether the edges of the candidate obstacle, the distance from the point of the candidate obstacle, and a color and a texture of the candidate obstacle in the obstacle image satisfy a preset projection background condition; and
         if the preset projection background condition is satisfied, determining that the candidate obstacle is a target obstacle satisfying the preset projection background condition and that the adjusted position is the projection-permitted position; and
      trigger the projector carried by the aerial vehicle to project an image onto the target obstacle.

6. The device of claim 5, wherein:
the storage medium is further configured to record position information of the projection-permitted position, the position information comprising coordinate information and altitude information,
the processor is further configured to execute the instructions stored in the storage medium to obtain coordinate data and altitude data of the aerial vehicle during the image projection, compare the obtained coordinate data and altitude data with the coordinate information and the altitude information of the projection-permitted position, and adjust the position of the aerial vehicle based on a comparison result to hold the aerial vehicle at the projection-permitted position.

7. The device of claim 5, wherein the processor is further configured to execute the instructions stored in the storage medium to, if no obstacle satisfying the preset projection background condition exists:
control the aerial vehicle to move to a new position; and
repeat the detecting and moving until an obstacle satisfying the preset projection background condition is detected.

8. The device of claim 5, wherein the processor is further configured to execute the instructions to:
use a sound collector of the aerial vehicle to collect an original sound signal if a recording operation is detected;
filter the collected original sound signal based on a preset sound frequency of a propeller, to obtain a sound signal; and
store the obtained sound signal or send the obtained sound signal to a user terminal.

9. An aerial vehicle, comprising:
a carrier configured to carry an external projection device;
a detector configured to detect edges of a candidate obstacle and a distance from a point of the candidate obstacle to the aerial vehicle, the candidate obstacle being an obstacle in a projecting direction of the projection device that is carried by the carrier;
a camera configured to capture an obstacle image containing the candidate obstacle in the projecting direction of the projection device that is carried by the carrier; and
a controller configured to:
adjust a position of the aerial vehicle to a projection-permitted position if an image projection event for the aerial vehicle is detected, comprising:
adjusting the position of the aerial vehicle,
determining whether (1) the edges of the candidate obstacle and the distance of the point of the candidate obstacle, which are provided by the detector, and (2) a color and texture of the candidate obstacle in the obstacle image captured by the camera satisfy a preset projection background condition, and
if the preset projection background condition is satisfied, determining that the candidate obstacle is a target obstacle satisfying the preset projection background condition, and
trigger the projection device carried by the carrier to project an image onto the target obstacle.

10. The aerial vehicle of claim 9, wherein the controller is further configured to:
record position information of the projection-permitted position, position information comprising coordinate information and altitude information,
obtain coordinate data and altitude data of the aerial vehicle during the image projection,
compare the obtained coordinate data and altitude data of the aerial vehicle with the coordinate information and altitude information of the projection-permitted position, and
adjust the position of the aerial vehicle based on a comparison result, such that the aerial vehicle is held at the projection-permitted position.

11. The aerial vehicle of claim 9, further comprising:
a sound collector configured to collect an original sound signal by using a sound collecting module of the aerial vehicle if a recording operation is detected,
wherein the controller is further configured to filter the collected original sound signal based on a preset sound frequency of a propeller, to obtain a sound signal, and store the obtained sound signal or send the obtained sound signal to a user terminal.

* * * * *